United States Patent [19]

Iwasaki

[11] 4,303,148

[45] Dec. 1, 1981

[54] SINGLE PISTON-CYLINDER DUO-SERVO DRUM BRAKE

[75] Inventor: Ryuichi Iwasaki, Hanyu, Japan

[73] Assignee: Akebono Brake Industry Company, Ltd., Tokyo, Japan

[21] Appl. No.: 93,872

[22] Filed: Nov. 13, 1979

[30] Foreign Application Priority Data

Nov. 10, 1978 [JP] Japan ................................ 53-138606

[51] Int. Cl.³ ............................................ F16D 51/00
[52] U.S. Cl. ..................................... 188/331; 188/363
[58] Field of Search ............... 188/363, 364, 362, 341, 188/327, 331, 332, 333, 205 A, 205 R, 325, 334, 206 A, 72.4, 73.3

[56] References Cited

U.S. PATENT DOCUMENTS 2,206,604  7/1940  Fowler ................................ 188/363
2,885,032  5/1959  Dombeck ........................ 188/327 X
3,361,229  1/1968  Swift .................................. 188/72.4

Primary Examiner—Douglas C. Butler
Attorney, Agent, or Firm—Armstrong, Nikaido, Marmelstein & Kubovcik

[57] ABSTRACT

In a drum brake, a wheel cylinder is located between a pair of adjacent shoe ends for a pair of brake shoes and a piston inserted into the wheel cylinder is slidably engaged through an anchor provided on a backing plate and further the piston is provided with a flange on the side thereof pressing a brake shoe so that the anchor is interposed between the flange of the piston and the wheel cylinder, and, furthermore, a strut is located between the other pair of adjacent shoe ends for the pair of the brake shoes in order to lighten a weight of the brake and facilitate a disassembly and assembly of the brake.

2 Claims, 1 Drawing Figure

SINGLE PISTON-CYLINDER DUO-SERVO DRUM BRAKE

BACKGROUND AND SUMMARY OF THE INVENTION

The present invention relates to a drum brake wherein a fitting construction of a wheel cylinder device is simplified so as to lighten the weight of a brake and facilitate disassembly and assembly of the brake, and further provide a function of a duo-servo brake.

In the conventional brakes of the kind, a wheel cylinder has been provided with flanges through which fitting bolts are inserted in order to fit the wheel cylinder to a backing plate. Therefore, it has been found that these assemblies suffer from the shortcoming of excessive weight formed by a volume of the cylinder body relative to the fitting portions such as flanges and the fitting bolts.

The present invention is directed to solve the shortcoming and has obtained an expected result in an arrangement wherein a piston of a wheel cylinder operating to expand brake shoes of a drum brake is slidably engaged through an anchor provided on a backing plate.

Further, the drum brake of the present invention provides a duo-servo function when the wheel cylinder is located between a pair of adjacent shoe ends for a pair of brake shoes and a strut is located between the other pair of adjacent shoe ends for the pair of brake shoes. In this case, the piston is provided with a flange on the side thereof pressing a brake shoe and the anchor aforementioned is advantageously interposed between the flange and the wheel cylinder.

In other words, it is because the wheel cylinder device is not only slidably supported by the anchor of the backing plate but also the flange of the piston or the wheel cylinder abuts on the anchor according to a rotating direction of a drum caused by a rotating force of the drum during a braking operation.

The drum brake of the present invention simplifies a fitting construction of the wheel cylinder device without impairing a function of a drum brake, lightens the weight of the brake, facilitates disassembly and assembly of the brake and functions as a duo-servo brake in such an arrangement as mentioned above.

Furthermore, if the anchor is integrated with the backing plate, the anchor becomes favorable in a strength in addition to the foregoing advantage.

DETAILED DESCRIPTION OF THE INVENTION

Figure 1:
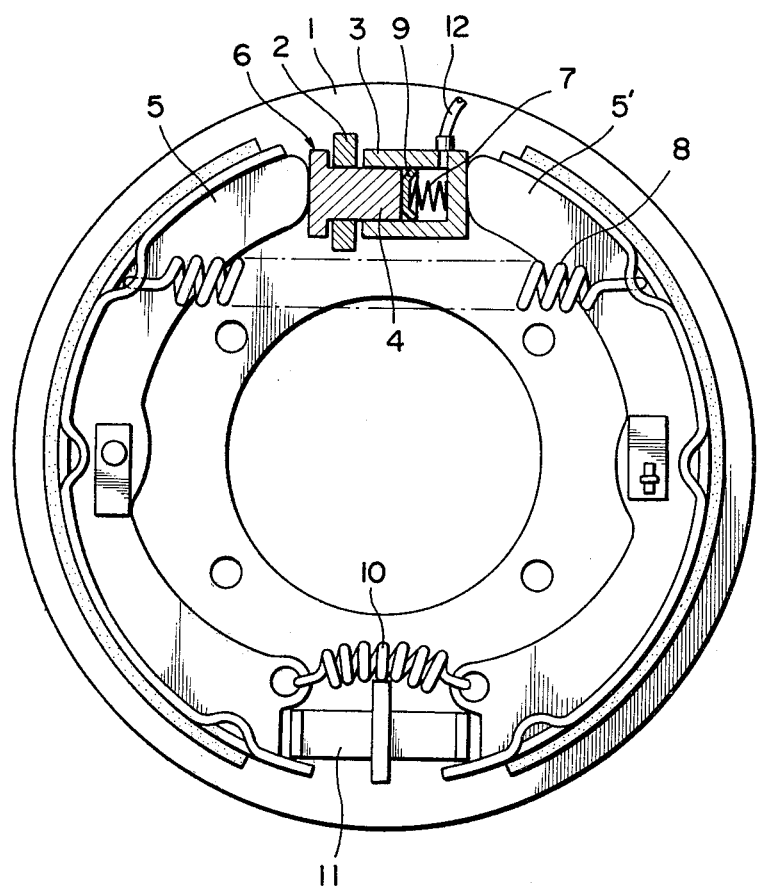
FIG. 1 shows a sectional view of a drum brake incorporating the present invention.

The details and advantages of the invention will be apparent from the following description of an embodiment with the accompanying drawing.

As indicated in FIG. 1, a backing plate 1 is provided with an anchor 2, through which a piston 4 of a wheel cylinder 3 is slidably engaged. A flange 6 is provided on the piston 4 on the side of the piston 4 pressing a brake shoe 5. The anchor 2 is interposed between the flange 6 and the wheel cylinder 3. The reference numerals 7, 8 and 9 indicate a spring, a shoe return spring and a seal respectively.

Further, the wheel cylinder 3 is located between a pair of adjacent shoe ends of the brake shoes 5 and 5'. A strut 11 in combination with a spring 10 is located between the other pair of adjacent shoe ends of the brake shoes 5 and 5' differently from the conventional arrangement wherein the other pair of adjacent shoe ends normally engage an anchor. The strut 11 engages the brake shoes 5,5' in such a manner that the both brake shoes 5 and 5' are supported by the backing plate 1 so as to be rotated in an unified assembly.

The drum brake of the present invention formed in the aforementioned arrangement operates as follows.

When a brake pedal is pressed, fluid pressure is introduced into the wheel cylinder 3 through a flexible hose 12 and forces the piston 4 and the wheel cylinder 3 to slide left and right to expand the brake shoes 5 and 5' toward a rotating drum (not shown) to effect a frictional force to the drum.

On that occasion, the wheel cylinder device 3 receives a turning force from the rotating drum through the brake shoes 5 and 5' and therefore the brake shoes 5 and 5' can be rotated by the turning force according to their turning directions until the flange 6 of the piston 4 or the wheel cylinder 3 abuts on the anchor such that a pressing force of the brake shoes 5 and 5' is increased owing to the turning force of the brake shoes 5 and 5' after the brake shoes being turned and the so-called "duo-servo" effect is thus obtained.

As may be appreciated from the foregoing description, the drum brake of the present invention lightens a weight of the brake by simplifying the fitting construction of the wheel cylinder device and facilitates a disassembly and assembly of the brake, and further proposes to have a duo-servo brake function, thereby rendering an industrial utilization greatly.

What is claimed is:

1. A duo-servo drum brake comprising:
    a pair of brake shoes housed in and engaging a brake drum, each shoe having ends, said pair being arranged defining first adjacent ends and second adjacent ends,
    an immovable anchor member disposed between said first adjacent ends,
    a piston slidably engaged through said anchor member to push one of said first adjacent ends in a first brake engaging direction, movement of said piston in a direction opposite to the first brake engaging direction being limited by abutment of said piston with said anchor member,
    a cylinder member slidably receiving said piston and defining therewith a chamber to receive brake fluid, said cylinder member being arranged to push the other of said first adjacent ends in a second brake engaging direction, movement of said cylinder member, in a direction opposite to the second brake engaging direction being limited by abutment of said cylinder member with said anchor member,
    a strut member connecting said second adjacent ends to each other, and
    means for supplying brake fluid under pressure to said chamber to create a braking force,
    whereby said braking force is received by said anchor member because of an abutment of said piston or said cylinder member with said anchor member.

2. A duo-servo drum brake according to claim 1, wherein said piston includes a flange formed on one end arranged to abut on said anchor member.

* * * * *